United States Patent [19]

Aoki et al.

[11] Patent Number: 5,303,239
[45] Date of Patent: Apr. 12, 1994

[54] TELEPHONE SYSTEM

[75] Inventors: Takashi Aoki; Yoshikazu Sano, both of Hino, Japan

[73] Assignee: Kabushiki Kaisha Toshiba, Kawasaki, Japan

[21] Appl. No.: 674,952

[22] Filed: Mar. 26, 1991

[30] Foreign Application Priority Data

Mar. 26, 1990 [JP] Japan .................................. 2-76282

[51] Int. Cl.$^5$ .............................................. H04J 3/24
[52] U.S. Cl. .............................. 370/94.2; 370/110.1; 379/88
[58] Field of Search ................ 370/94.2, 94.3, 95.3, 370/110.1, 95.1, 58.2, 77; 379/88, 219

[56] References Cited

U.S. PATENT DOCUMENTS

| | | | |
|---|---|---|---|
| 4,553,235 | 11/1985 | Svensson | 370/94.3 |
| 5,018,195 | 5/1991 | Hall | 379/219 |
| 5,023,868 | 6/1991 | Davidson et al. | 379/88 |
| 5,062,133 | 10/1991 | Melrose | 379/211 |

Primary Examiner—Douglas W. Olms
Assistant Examiner—Shick Hom
Attorney, Agent, or Firm—Foley & Lardner

[57] ABSTRACT

The telephone system comprises a central or key service unit 1, data terminal units $5_1$ to $5_n$, and data set circuits of data terminal interface units $27_1$ to $27_n$ for communications between the central unit 1 and the data terminal units $5_1$ to $5_n$, respectively. The central unit 1 includes a time switch 17 for executing exchange service and a control unit 19 for controlling the time switch 17. Each interface unit $27_1$ to $27_n$ is connected to the time switch 17 for communication of communication-data and connected to the control unit 19 for communication of control-data. Each interface unit $27_1$ to $27_n$ enables and disables communication of communication-data between each data terminal $5_1$ to $5_n$ and the time switch 17 in response to predetermined control commands received from each data terminal unit $5_1$ to $5_n$.

4 Claims, 9 Drawing Sheets

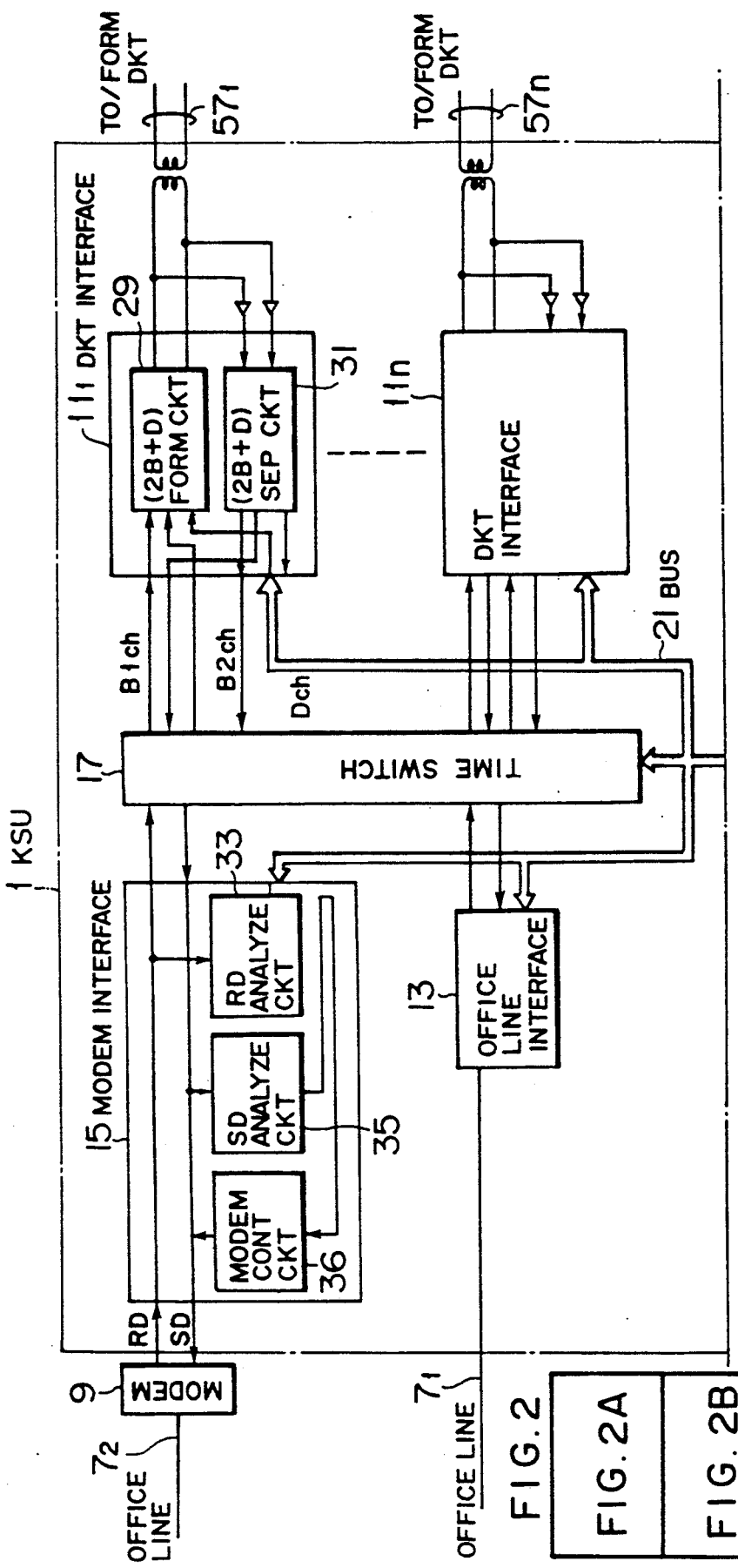

TELEPHONE SYSTEM

BACKGROUND OF THE INVENTION

The present invention relates to a telephone system including a central unit provided with an exchange service function and a plurality of digital key telephone sets, and more specifically to a telephone system including digital key telephone sets each connected to a data processing terminal unit such as a personal computer, for instance.

There is known a key telephone system such that a data processing terminal unit such as a personal computer is connectable to each extension telephone set to enable data communications between given extension data terminal units. The general system configuration of the above-mentioned key telephone system is as follows: a plurality of extension key telephone sets each provided with an interface unit (e.g. RS-232C) are connected to a key service unit provided with a switching unit for exchange service and a control unit, and each data processing terminal unit is connected to each interface unit (e.g. RS-232C) for communications with the key service unit.

In the telephone system as described above, the start, interruption, restart, end, etc. of data communications between the data terminal units are executed by the corresponding exchange service of the key service unit in response to commands given from each data terminal unit to request various data communication operations. For instance, in response to a command to request a call transmitted from a data terminal unit, a control unit of the key service unit controls a switching unit so as to connect a communication path between a calling data terminal unit and a called data terminal unit, so that data communications between the two data terminal units can be started. On the other hand, in response to a command to request an interrupt transmitted from one of the data terminal units now executing data communications, the key service unit disconnects the communication path. Thereafter, in response to a command to request a restart transmitted from the same terminal unit, the key service unit reconnects the same communication path to restart the data communications.

In the above-mentioned prior-art telephone system, there exists a problem in that it is impossible to immediately execute the interrupt or restart operation of data communications in response to commands transmitted from a data terminal unit.

In more detail, when an interrupt command is transmitted from one data terminal unit during data communications for some reasons, under the condition that the control unit of the key service unit is in an overload state (i.e. plural incoming and/or outgoing calls are generated simultaneously so that control processing is delayed momentarily), the communication path is disconnected with a delay after the command has been transmitted. As a result, communication data transmitted from one data terminal unit continue to be inputted to the other data terminal unit even after the interrupt command has been transmitted. In the case where the data terminal unit is connected to the interface unit (RS-232C) in three-wire connection method, in particular, the following problems arise:

In a three-wire connection system, data communications between the data terminal unit and the interface are effected through only two data lines (i.e. sending data (SD) line and receiving data (RD) line). In general, when receiving a control command transmitted from a data terminal unit, the interface unit transmits control data corresponding to the control command and thereafter returns a result code indicative of an end of control data transmission to the data terminal unit. In response to the returned result code, the data terminal unit confirms that the command transmitted from its own unit has been received normally. However, in case some communication data transmitted from one data terminal unit continue to be inputted to the other data terminal unit after the command has been transmitted as described above, since the communication data and the result code are transmitted via the same data (RD) line, the result code cannot be discriminated by the data terminal unit.

Further, where a command to request restart of interrupted data communications is transmitted by one data terminal unit, similar problems arise: when the control unit of the key service unit is in an overload state, since the communication path is reconnected with a delay after the restart command has been transmitted, the head portion of the communication data transmitted immediately after the restart command has been transmitted will not be received by the other data terminal unit.

SUMMARY OF THE INVENTION

With these problems in mind, therefore, it is the object of the present invention to provide a telephone system having a plural data terminal units connected to a control (key service) unit provided with an exchange service function, by which the processing (e.g. start, interrupt, restart, etc.) of data communications can be executed immediately in response to commands transmitted by the data terminal units, without being dependent upon the exchange service of the central unit.

To achieve the above-mentioned object, the present invention provides a telephone system comprising: central means having exchange means for executing exchange service and exchange control means for controlling said exchange means; and interface means connected to said exchange means for communication of communication-data therewith, connected to said exchange control means for communication of control-data therewith, and connected to a data terminal unit for providing an interface for communication of the communication-data between the central means and the data terminal unit, said interface means enabling and disabling communication-data communication between said central means and the data terminal unit in response to predetermined control commands included in a data stream received from the data terminal unit.

In the telephone system according to the present invention, interface means provided between each data terminal unit and the central unit controls the data communications between the two in response to predetermined commands received from each data terminal unit. Therefore, it is possible to control interrupt, restart, etc. of data communications, without depending upon the exchange service means of the central unit, that is, while keeping the communication path connected in the central unit.

BRIEF DESCRIPTION OF THE DRAWINGS

FIG. 2 shows the manner of aligning FIGS. 2A-2C.

FIGS. 2A-2C are block diagrams which together show a key service unit of the digital key telephone system shown in FIG. 1;

DESCRIPTION OF THE PREFERRED EMBODIMENTS

An embodiment of the present invention will be described hereinbelow with reference to the attached drawings.

Figure 1:
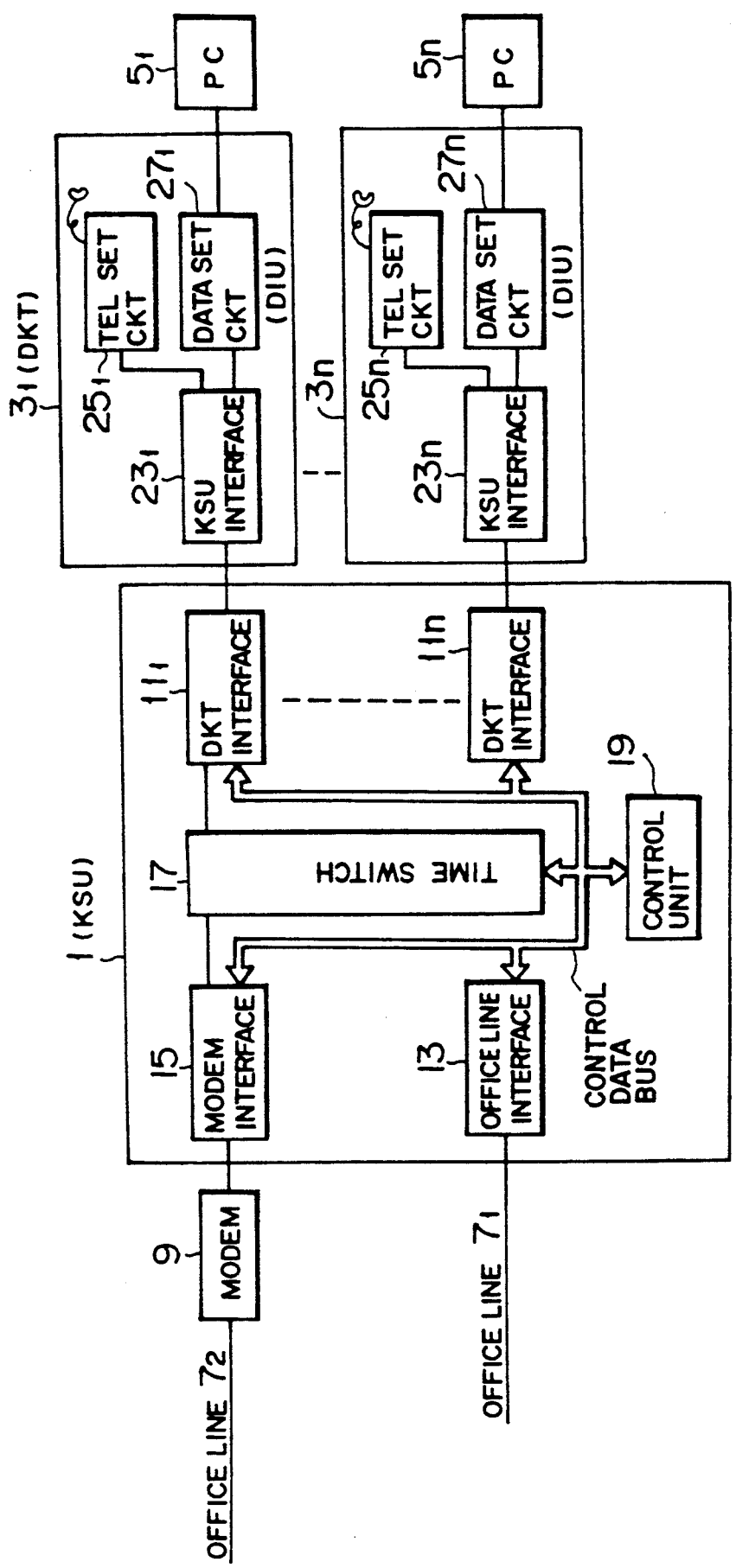
FIG. 1 is a block diagram showing an embodiment of the telephone system according to the present invention, in which a digital key telephone system is shown by way of example.

FIG. 1 is a block diagram showing an embodiment of the present invention, in which a key telephone system is shown by way of example. As shown, a plurality (n) of digital key telephone sets (DKT) $3_1$ to $3_n$ are connected to a central unit or key service unit (KSU) provided with exchange and control service functions, and further a plurality (n) of data terminal units such as personal computers (PC) $5_1$ to $5_n$ are connected to the digital key telephone sets (DKT), respectively. An analog office line $7_1$ and a modem 9 are connected to the key service unit 1. Another office line $7_2$ is connected to the modem 9. Each personal computer $5_1$ to $5_n$ has access to the office line $7_2$ via the modem 9. Further, the interface between the modem 9 and the key service unit 1 is RS-232C.

The key service unit 1 includes a plurality of digital key telephone set (DKT) interface units $11_1$ to $11_n$ connected to the digital key telephone sets $3_1$ to $3_n$, an office line interface unit 13 connected to the office line $7_1$, and a modem interface unit 15 connected to the modem 9. All of these interface units are connected to a time switch 17 for controlling exchange service between these interface units. Hereinafter, data transmission from the time switch 17 to these interface units is referred to as "down-stream data transmission" and data transmission in the opposite direction is referred to as "up-stream data transmission". Further, these interface units and the time switch 17 are connected to the control unit 19 for controlling the system operation, via a control data bus 21.

The digital key telephone set 3 includes a key service unit (KSU) interface unit 23 connected to the DKT interface unit 11 in the key service unit 1, a telephone set circuit 25 having a speech network, a dial circuit, a handset, etc. to enable various key telephone set functions, and a data set circuit or data terminal interface unit 27 connected to the data terminal unit 5. Data are ping-pong transmitted between the KSU interface unit 23 and the DKT interface unit 11 via (2B+D) time-division channel, for instance. In more detail, data packets obtained through two time-division signal channels B1 and B2 and a time-division data channel D in combination are transmitted between the KSU interface unit 23 and the DKT interface unit 11. The B1 channel is used to transmit speech data when the key telephone set 3 is in speech operation, and the B2 channel is used to transmit data when the personal computer is in data communication operation. On the other hand, the D channel is used to transmit various control commands (to control various operations such as incoming call, outgoing call, response, interrupt and restart of data communications, speech end, etc.) and result codes. Data transmitted through B channel is referred to as "communication data", and data transmitted through D channel is referred to as "control data", hereinafter.

Figure 2B:
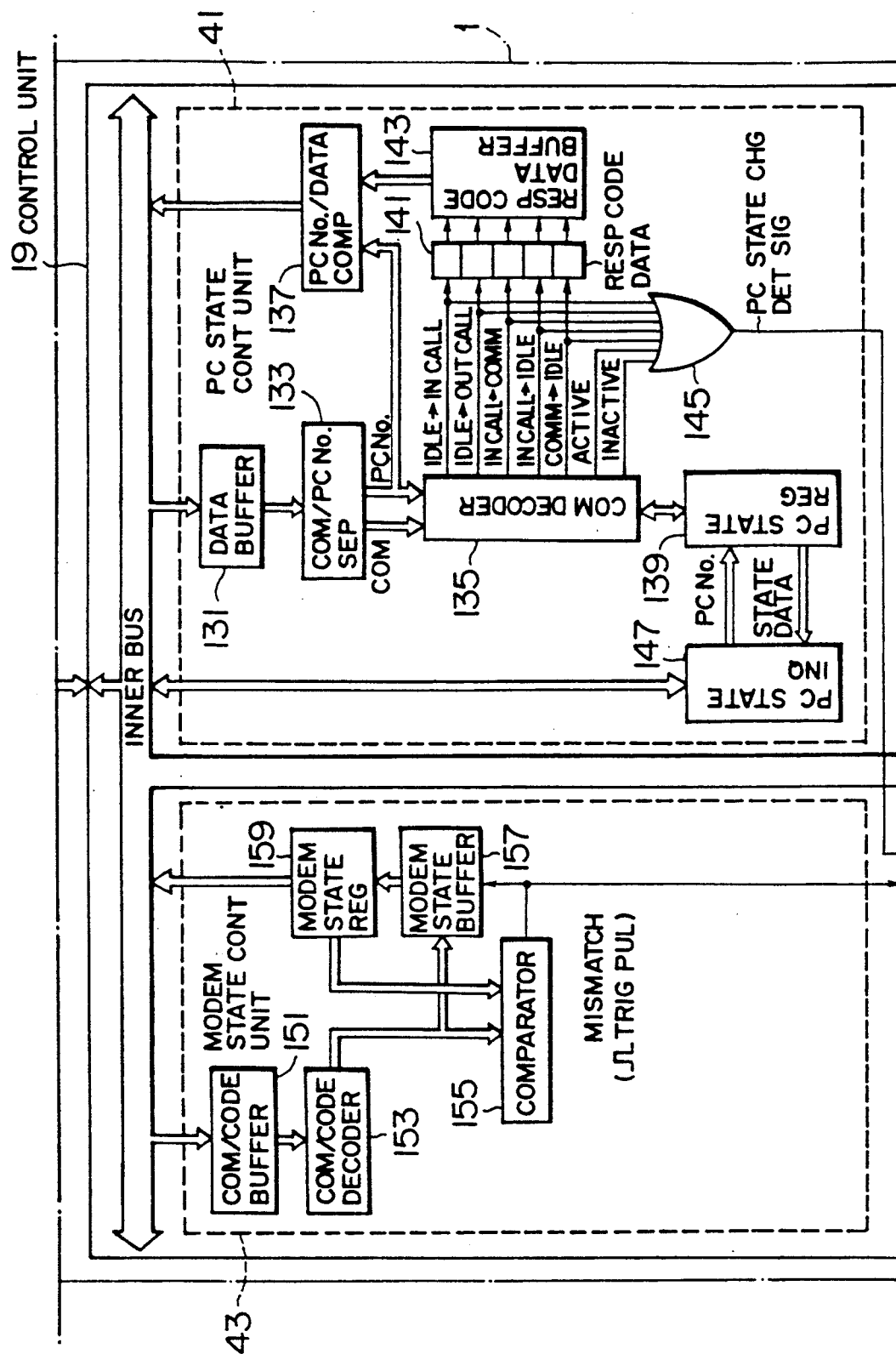
Figure 2C:
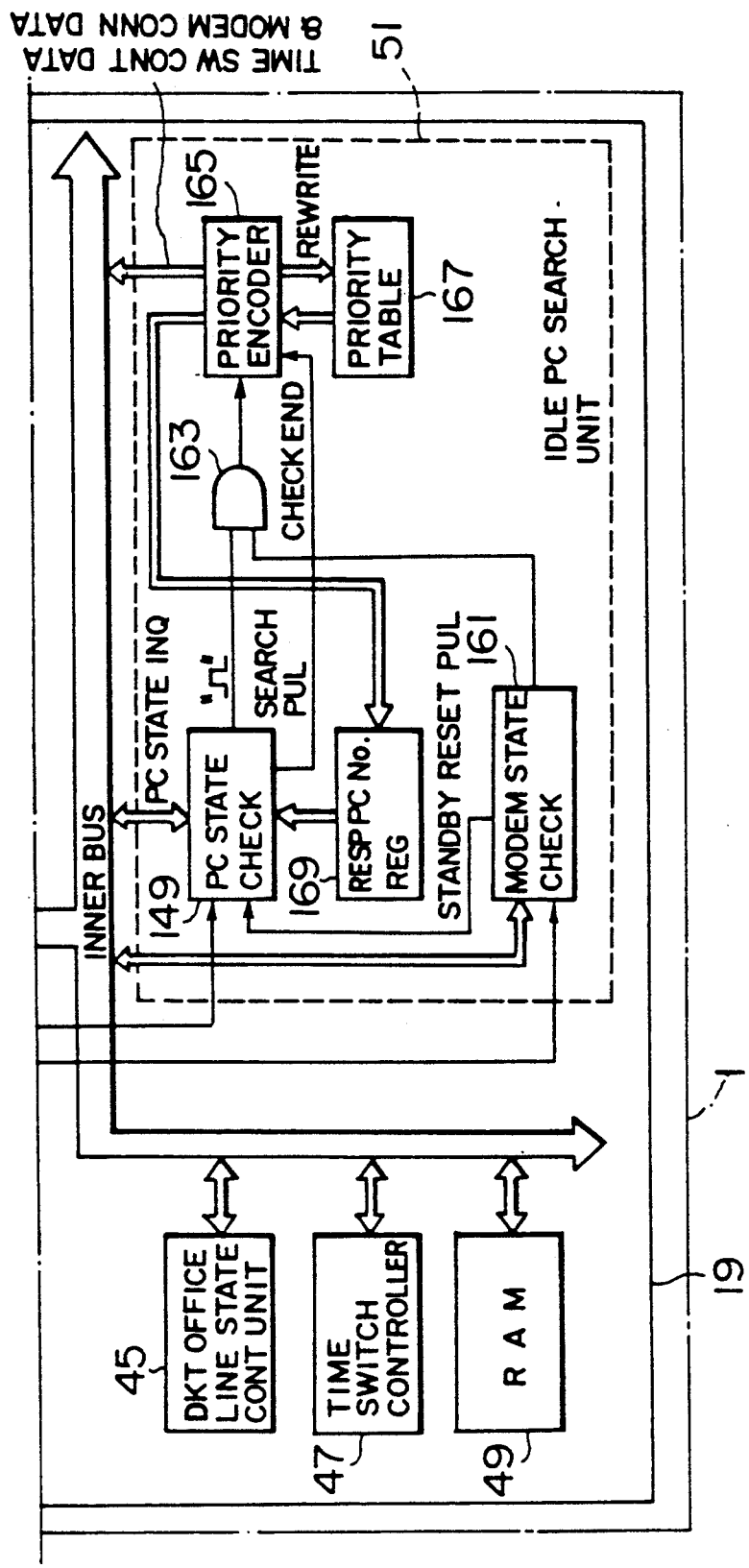

FIGS. 2A-2C show each section of the key service unit 1. The DKT interface unit 11 includes a (2B+D) forming circuit 29 and a (2B+D) separating circuit 31. The (2B+D) forming circuit 29 receives communication data from two designated down-stream time slots outputted from the time switch 17 and control data from the control unit 19 via the bus 21, and forms (2B+D) data packets by multiplexing these data to transmit data to the key telephone set 3. Further, the (2B+D) separating circuit 31 receives the (2B+D) data packets from the key telephone set 3, separates the data for each channel, transmits the separated communication data to two designated up-stream time slots inputted to the time switch 17 and the separated control data to the control unit 19 via the bus 21. The transmission of the (2B+D) forming circuit 29 and the reception of the (2B+D) separating circuit 31 are executed independently in time division mode.

The modem interface unit 15 is an interface equivalent to so-called three-wire RS-232C interface. That is, this modem interface unit 15 receives data from the modem 9 via the RD line and transmits the received data to one designated down-stream time slot of the time switch 17, and further receives data from one designated up-stream time slot of the time switch 17 and transmits the received data to the modem 9 via the SD line. This modem interface unit 15 includes an RD analyzing circuit 33 and a SD analyzing circuit 35. These analyzing circuits 33 and 35 monitor and analyze data (RD and SD) transmitted between the modem 9 and the time switch 17 via the interface unit 15, and transmit control data corresponding to the results to the control unit 19 via the bus 21. Further, a modem control circuit 36 receives control data from the control unit 19 and transmits control commands corresponding thereto to the modem 9, while having access to the control unit 19 to check the presence or absence of carriers required for control.

The office line interface unit 13 is provided with various functions such as the function of detecting outgoing and incoming call signals to and from the office line $7_1$, the function of transmitting communication data between the office line $7_1$ and the time switch 17, etc. The office line interface unit 13 is so selected as to be applicable to the sort of the office lines $7_1$ (e.g. analog office line,. INDN office line, etc.). In the case of an ISDN (integrated service digital network) office line, 9 (2B+D) forming circuit 9 (2B+D) separating circuit both similar to those provided in the DKT interface unit 29 are incorporated in the office line interface unit 13.

The control unit 19 includes a PC state control unit 41, a modem state control unit 43, a DKT/office line state control unit 45, a time switch controller 47, a RAM 49, and an idle PC search unit 51. The PC state control unit 41 monitors the states (e.g. standby, incoming call, data communication, etc.) of the personal computers $5_1$ to $5_n$ on the basis of control data given by the DKT interface units $11_1$ to $11_n$, and transmits control data to the DKT interface units $11_1$ to $11_n$ to control the personal computers $5_1$ to $5_n$. The modem state control unit 43 monitors the state of the modem 9 on the basis of the control data given by the modem interface unit 15, and transmits necessary control data to the modem interface unit 15. The DKT/office line state control unit 43 monitors and controls the states of the key telephone sets $3_1$ to $3_n$ and the office line $7_1$ by transmitting control data between the DKT interface units $11_1$ to $11_n$ and the office line interface unit 13. The states of the personal computers, modem, key telephone sets and office line $7_1$ are all stored in a state table in a RAM 49.

The time switch controller 47 controls the time switch 17 according to the state of each terminal unit and office line to connect/disconnect the communication path.

The idle PC search unit 51 searches for an idle personal computer from the table in the RAM 49, and designates it as a personal computer which can respond to an incoming call through the office line $7_2$.

Figure 3:
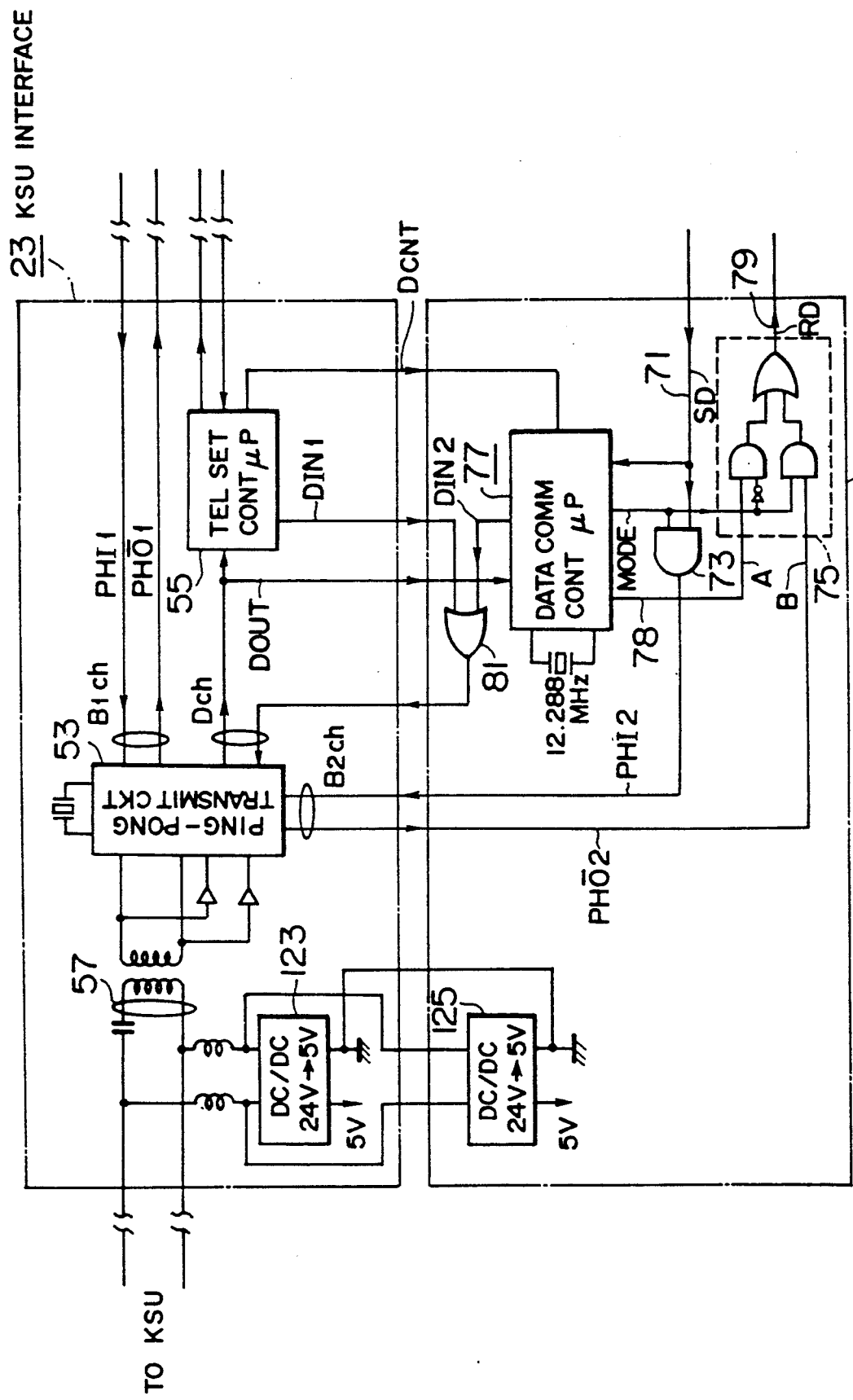
FIG. 3 is a block diagram showing a key service unit, interface unit and a data terminal unit interface unit of the digital key telephone set of the embodiment shown in FIG. 1.

FIG. 3 shows a detailed configuration of the KSU interface unit 23 and the data terminal interface unit 27 both incorporated in the digital key telephone set 3.

Figure 4:
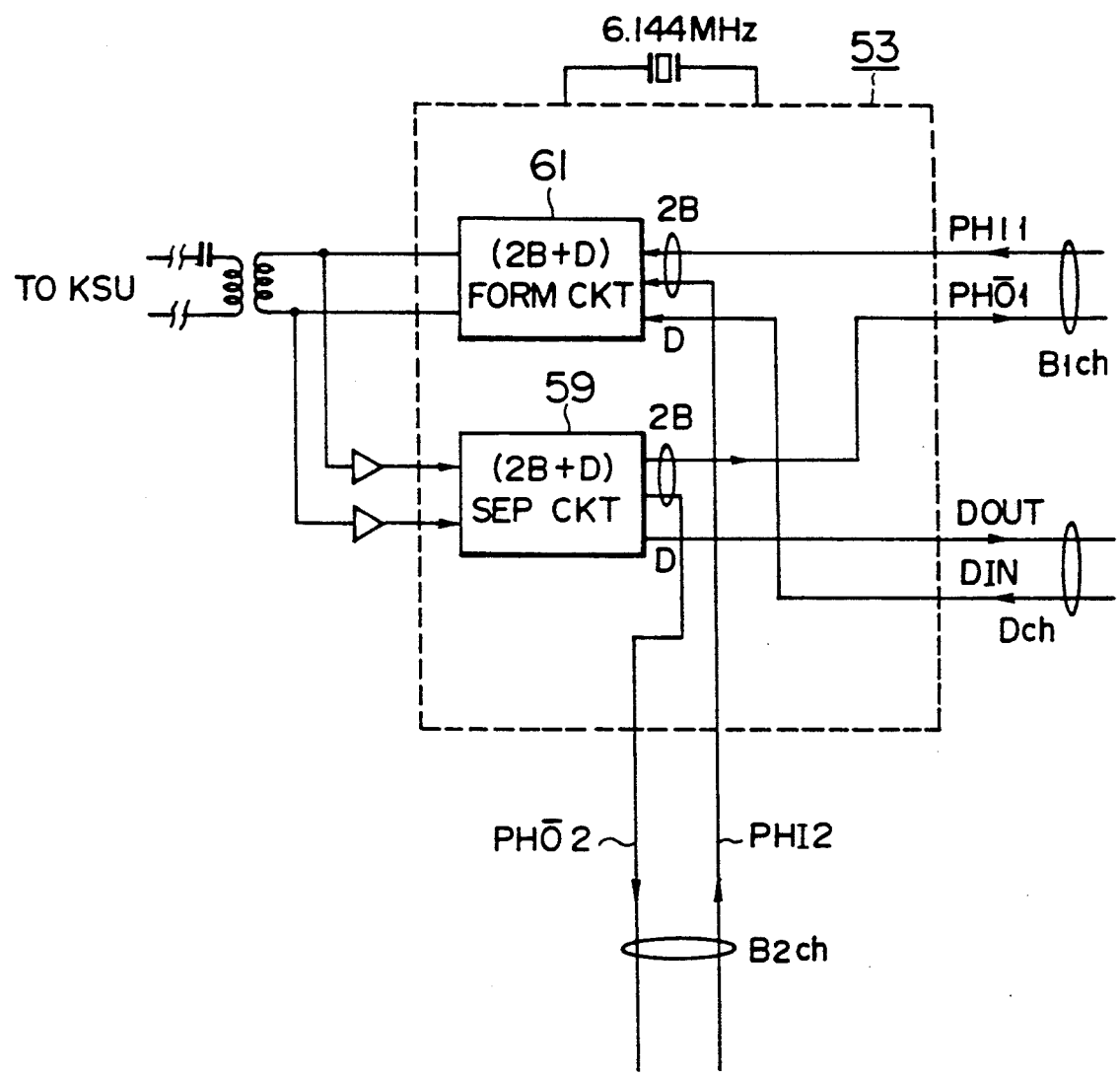
FIG. 4 is a block diagram showing a ping-pong transmission circuit provided in the key service unit interface shown in FIG. 3.

The KSU interface unit 23 includes a ping-pong transmission circuit 53 and a telephone set control microprocessor 53. The ping-pong transmission circuit 55 is connected to the DKT interface unit 11 of the key service unit 1 via a two-wire signal line 57, and provided with a (2B+D) separating circuit 59 and a (2B+D) forming circuit 61 as shown in FIG. 4. The (2B+D) separating circuit 59 receives down-stream packets from the key service unit 1, separates the received data packet into down-stream data PH01, PH02 and DOUT for each channel, and outputs these data. The outputted B1-channel down-stream communication (speech) data PH01 are transmitted to the telephone set circuit 25; the B2-channel down-stream communication data are transmitted to the data terminal interface unit 27; and the down-stream control data are transmitted to the telephone set control microprocessor 55 and the data terminal interface unit 27. Further, B1-channel up-stream communication (speech) data HI1 are inputted from the telephone set circuit 25 to the ping-pong transmission circuit 53; and B2-channel up-stream communication data PHI2 and up-stream control data DIN are inputted from the data terminal interface unit 27 to the transmission circuit 53. These up-stream data PHI1, PHI2 and DIN are multiplexed into the up-stream (2B+D) packet by the (2B+D) forming circuit 61, and then transmitted to the key service unit 1 via the signal line 57. The down-stream packet reception and the up-stream packet transmission are executed independently in time division manner.

Figure 5:
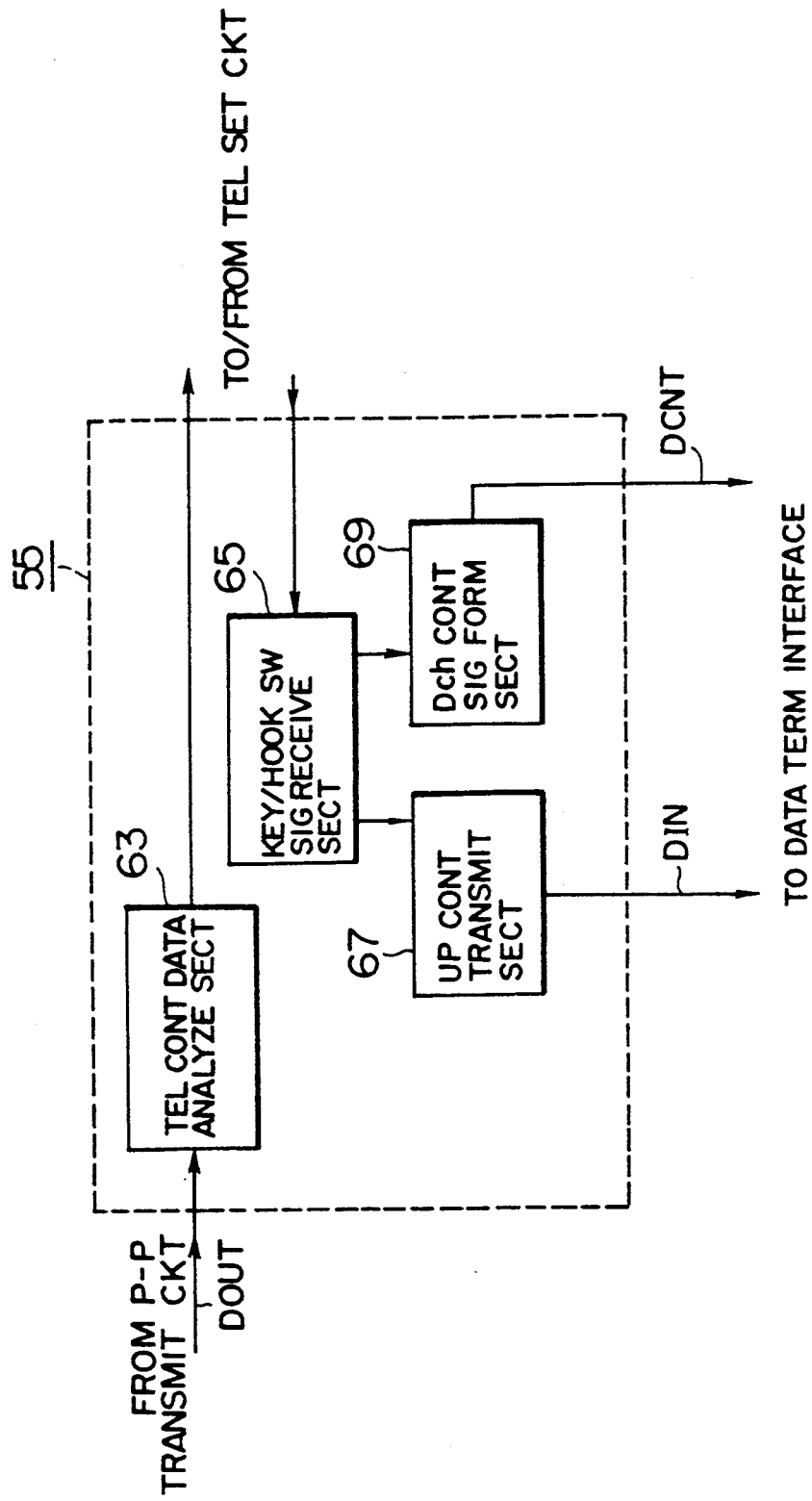
FIG. 5 is a block diagram showing a microprocessor for controlling a telephone set, which is provided in the key service unit interface shown in FIG. 3.

The telephone set control microprocessor 55 controls the operation of the telephone set circuit 25. This microprocessor 55 includes a telephone set control data analyzing section 63, a key/hook switch signal receiving section 65, an up-stream control data transmitting section 67, and a D-channel control signal forming section 69, as shown in FIG. 5. The telephone set control data analyzing section 63 receives down-stream control data DOUT from the ping-pong transmission circuit 53, analyzes the control data (if DOUT are data for controlling the corresponding key telephone set), and transmits control signals to the telephone set circuit 25 in order to turn on a display LED, generate a call tone, etc. according to the analyzed result. The key/hook switch signal receiving section 65 receives key signals (generated when dial keys or function keys of the key telephone set are depressed) and hook signals indicative of handset on/off hook transmitted from the telephone set circuit 25, forms control data corresponding to the received signals, and transmits the formed control data to the up-stream control data transmitting section 67. The up-stream control data transmitting section 67 transmits the received control data to the data terminal interface unit 27 as the first up-stream control data DIN 1.

Further, the key/hook switch signal receiving section 65 gives an information signal indicative of the presence or absence of signals inputted from the telephone set circuit 25, to the D-channel control signal forming section 69. On the basis of the information signal, the D-channel control signal forming section 69 forms a D-channel control signal DCNT ("H" if the signal is inputted but "L" if not inputted), and gives it to the data terminal interface unit 27.

As described later, the D-channel control signal DCNT controls the control data transmission from the data terminal interface unit 27 to the D-channel.

The data terminal interface unit 27 will be explained hereinbelow. As shown in FIG. 3, the data terminal interface unit 27 formed of RS-232C interface is connected to the personal computer 5 via three lines (SD, RD and SG) (SG line is not shown). Data SD transmitted from the personal computer 5 are inputted to the data terminal interface unit 27 via the SD line 71, irrespective of whether communication data or control data. The transmitted data SD are inputted to a data communication control microprocessor 77 and also to an AND gate 73. The output data of this AND gate 73 are inputted to the ping-pong transmission circuit 53 as the B2-channel up-stream communication data PHI2. Further, the B2-channel down-stream data PH02 from the ping-pong transmission circuit 53 are applied to an input terminal B of a selector 75. The output data of the selector 75 are received by the personal computer 5 via the SD line 79.

The AND gate 73 and the selector 75 are controlled in response to a mode signal MODE of high/low ("H"/"L") level transmitted by a data communication control microprocessor 77. In more detail, the mode signal MODE is kept at "H" level during data communication to open the AND gate 73 and to allow the selector 75 to select an input terminal B. Therefore, the data SD transmitted from the personal computer 5 become the B2-channel up-stream communication data PHI2, and the B2-channel down-stream communication data PH02 become the data RD received by the personal computer 5. As a result, communication data can be transmitted between the personal computer 5 and the key service unit 1.

On the other hand, when outgoing and incoming call signals are controlled, the mode signal MODE is kept at "L" level to close the AND gate 73 and to allow the selector 75 to select an input terminal A.

To this terminal A, an output terminal 78 of the data communication control microprocessor 77 is connected to output control data to the personal computer 5. Therefore, the data SD transmitted by the personal computer 5 are transmitted to only the data communication control microprocessor 77 (without being transmitted to the B-channel), and only the control data outputted by the data communication control microprocessor 77 are received by the personal computer 5 as data RD. As a result, control data can be transmitted between the personal computer 5 and the data communication control microprocessor 77. When the control data are being transmitted, the communication data are blocked (not transmitted).

Figure 6:
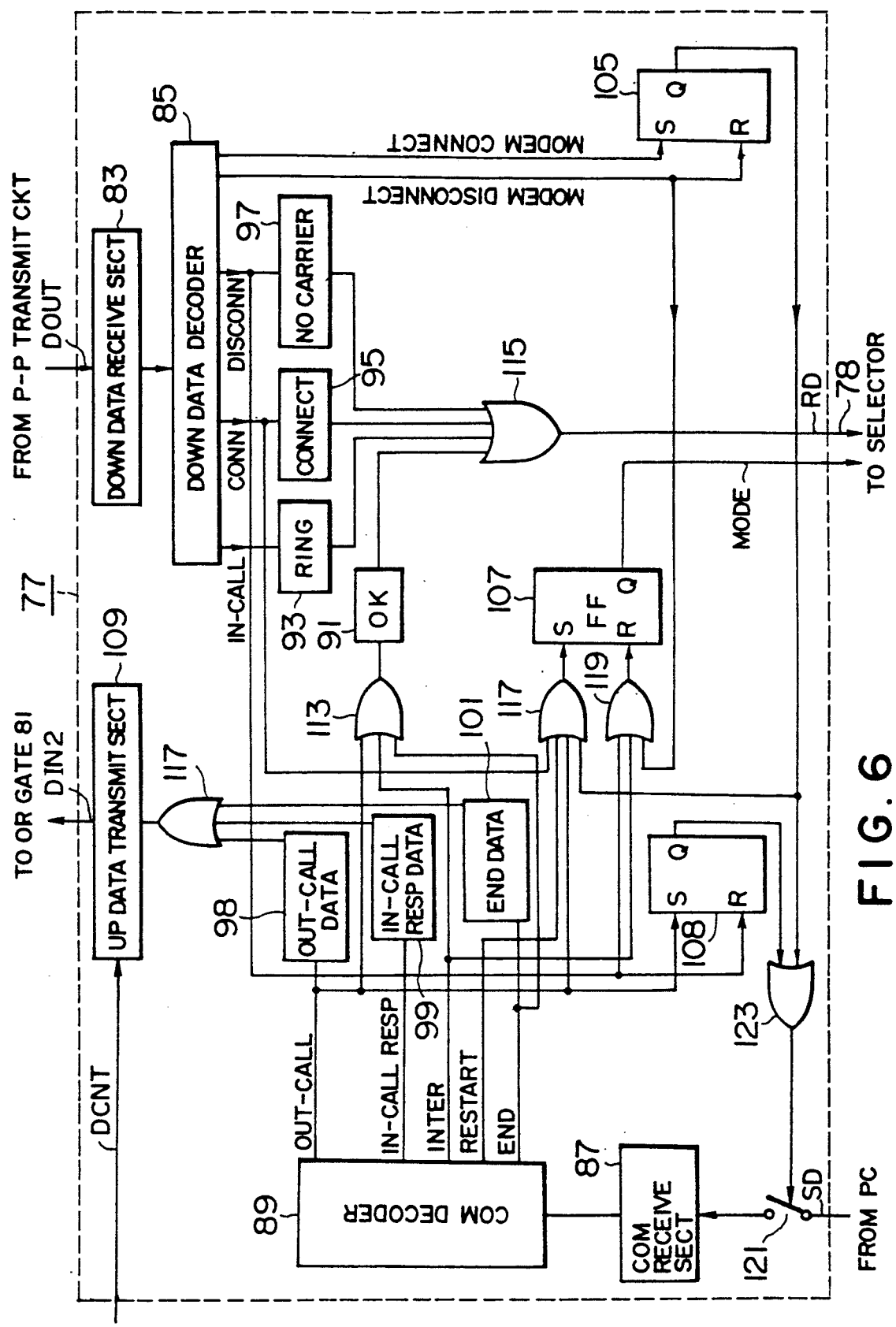
FIG. 6 is a block diagram showing a microprocessor for controlling data communications, which is provided in the data terminal unit interface shown in FIG. 3.

FIG. 6 shows the internal configuration of the data communication control microprocessor 77. The microprocessor 77 includes a down-stream data receiving section 83, a down-stream data decoder 85, a command receiving section 87, a command decoder 89, various result code generating sections 91, 93, 95 and 97, various up-stream data generating sections 98, 99 and 101, flip-flops 105, 107 and 108, and an up-stream data transmitting section 109.

The down-stream data receiving section 83 receives the D-channel down-stream data DOUT from the ping-pong transmission circuit 53, extracts control data for the data communication control microprocessor 77 therefrom, and transmits the extracted control data to the down-stream data decoder 85. The down-stream data decoder 85 decodes the received down-stream control data. These down-stream data are an incoming call signal data indicative of an incoming call, connection data indicative of connection to another extension telephone set via the time switch 17, disconnection data indicative of disconnection from the extension telephone set, modem connection data indicative of connection to the modem via the time switch 17, and modem disconnection data indicative of disconnection from the modem. If the decoded data is the incoming call data, a ring generating section 93 is activated; if the connection data, a connect generating section 95 is activated; if the disconnection data, a no-carrier generating section 97 is activated, respectively, so that result codes of RING, CONNECT, NO CARRIER are outputted by the generating sections, respectively. Further, if the modem connection data is decoded, the flip-flop 105 is set; and if the modem disconnection data is decoded, the flip-flop 105 is reset, when this flip-flop 105 is kept set, since the switch 121 is kept open, the data SD transmitted by the personal computer 5 are not inputted to the command receiving section 87.

The command receiving section 87 receives the data SD transmitted by the personal computer 5, extracts control commands (referred to as "AT commands", in general) from the data stream, and transmits the extracted data to the command decoder 89. The command decoder 89 decodes the transmitted control commands. These control commands are an outgoing call command to generate an outgoing call, an incoming call command to generate an incoming call, an interrupt command to interrupt data communication, a restart command to restart interrupted data communication, and an end command to end data communication. If the decoded command is an outgoing call command, an outgoing call data generating section 98 is activated to output an outgoing call data; if an incoming call response command, an incoming call response data generating section 99 is activated to output incoming call response data; and if an end command, an end data generating section 101 is activated to output end data. These data are outputted by the up-stream data transmitting section 109 as the second D-channel up-stream data DIN 2.

Further, the outgoing call command, the interrupt command or the end command is decoded, an OK generating section 91 is activated to output a result code OK. This result code OK and the aforementioned other result codes RING, CONNECT and NO CARRIER are all transmitted to the input terminal A of the selector 75 via an OR gate 115 and then received by the personal computer 5.

The flip-flop 107 generates a mode signal MODE. When the connection data, the outgoing call command or the restart command is decoded or when the flip-flop 105 is set, this flip-flop 107 is set to generate an H-level mode signal MODE. On the other hand, when the disconnection data, the modem disconnection data or the interrupt command is decoded, this flip-flop 107 is reset to generate an L-level mode signal MODE.

The flip-flop 108 is set in response to an outgoing call command and reset in response to the connection data. When this flip-flop 108 is being set, the switch 121 is turned off, so that the data SD transmitted by the personal computer 5 are not inputted to the command receiving section 87.

The microprocessor 77 has three operation modes, namely, control mode, connection standby mode and communication mode. In the control and connection standby modes, the mode signal MODE changes to L-level, so that the personal computer 5 is disconnected from the B2-channel. Further, in the connection standby mode, since the flip-flop 108 is set and the switch 121 is turned off, control commands transmitted by the personal computer 5 are not received. On the other hand, in the communication mode, since the mode signal MODE changes to H-level, the personal computer 5 is connected to the B2-channel.

To the up-stream data transmitting section 109, D-channel control signals DCNT from the telephone set control microprocessor 55 are applied. Only when this control signal DCNT is at L-level (i.e. the first D-channel up-stream data DIN 1 are not outputted from the telephone set control microprocessor 55), the up-stream data transmitting section 109 outputs the second D-channel up-stream data DIN 2. Both the first and second D-channel up-stream data DIN 1 nd DIN 2 are inputted to the ping-pong transmission circuit 53 via the OR gate 81 as the D-channel up-stream data DIN 1. The control operation of the D-channel control signal DCNT prevents the first and second D-channel up-stream data DIN 1 and 2 from interfering with each other.

With reference to FIG. 3, voltage supply circuits 123 and 125 provided in the KSU interface unit 23 and the data terminal interface unit 27 convert a dc voltage (e.g. 24 V) supplied via a signal line 57 into another dc voltage (e.g. 5 V) to supply it to both the interface units 23 and 27.

Figure 7:
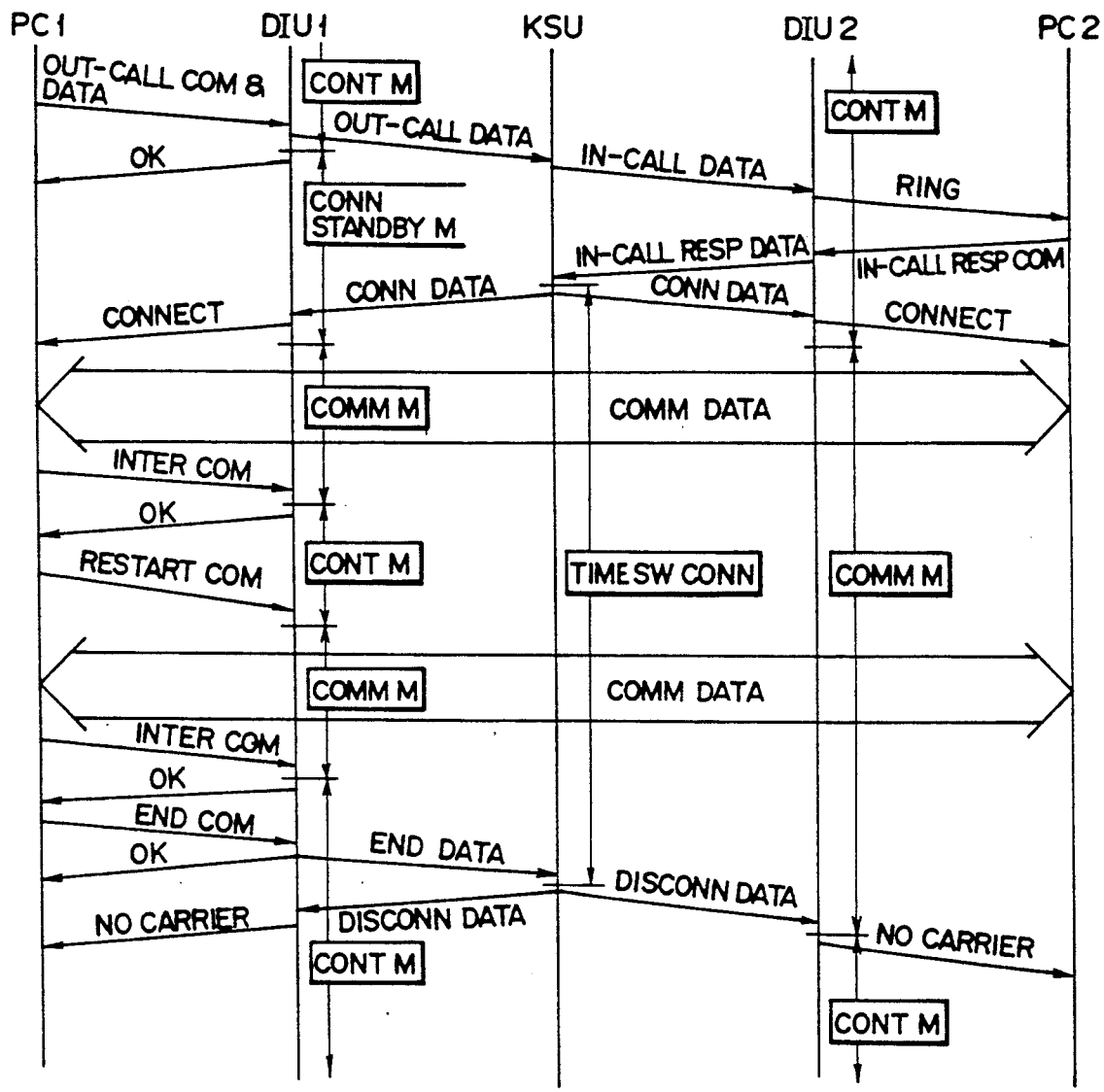
FIG. 7 is a sequence diagram for assistance in explaining the sequence from start to end of mutual data communications between two personal computers of the embodiment shown in FIG. 1.

With reference to FIG. 7, the sequence of data communications between two personal computers incorporated in the digital key telephone system constructed as described above will be described hereinbelow from the start to end. In the following explanation, a personal computer transmitting an outgoing call is referred to as PC1; a data terminal interface unit connected to the PC1 is referred to as DIU 1; a personal computer receiving an incoming call is referred to as PC2; a data terminal interface unit connected to the PC2 is referred to as DIU 2; and the key service unit is referred to as KSU, simply.

Now, the assumption is made that the PC1 and PC2 are both in standby state. In this state, the DIU 1 and DIU 2 are in the control mode. In this control mode, since the mode signal MODE is a L-level in both the DIU 1 and DIU 2, the PC1 and PC2 can communicate only with the data communication microprocessors 77 in the DIU 1 and DIU 2, without having access to the D2-channel.

Under these conditions, when the PC1 transmits an outgoing call command and dial data representative of an extension telephone number of the PC2, these outgoing call command and the dial data are received by the control-mode data communication microprocessor 77 in the DIU 1. In response to the call command and dial data, the data communication microprocessor 77 switches the operation mode from the control mode to the connection standby mode, and outputs call data to request the PC2 to be called as the D-channel up-stream data DIN. This call data is transmitted to the KSU via the D-channel After that, the data communication microprocessor 77 transmits a result code OK indicative of command execution end to the PC1.

In the KSU, the call data from the DIU 1 is transmitted to the control unit 19 via the control data bus 21. In response to the call data, the control unit 19 outputs an incoming call data to the bus 21. This incoming call data is transmitted from the KSU to the DIU 2 via the D-channel. In response to the incoming call data from the KSU, the control-mode data communication microprocessor 77 in the DIU 2 transmits a result code RING representative of an incoming call to the PC2.

In response to the result code RING, the PC2 outputs an incoming call response command. This incoming call response command is received by the control-mode DIU 2, so that incoming call response data is transmitted to the KSU via the D-channel. In response to the incoming call response data, the control unit 19 of the KSU controls the time switch 17 so that a communication path between the PC1 and PC2 is connected, and further connection data is outputted to the bus 21. This connection data is transmitted from the KSU to the DIU 1 and DIU 2 via each channel. In response to the connection data, the DIU 1 and DIU 2 transmit result codes CONNECT indicative of connection to the PC1 and PC2. Thereafter, the operation mode of the DIU 1 and DIU 2 is switched to the communication mode, respectively. Therefore, since both the PC1 and PC2 have access to each B2-channel, data communications are enabled between the PC1 and PC2 via the time switch 17 of the KSU.

When data communications are required to be interrupted, the PC1 transmits an interrupt command to the DIU 1. The transmitted interrupt command is received by the communication-mode data communication microprocessor 77 in the DIU 1. Then, the data communication microprocessor 77 changes the operation mode from the communication mode to the control mode, and returns a result code OK to the PC1. Since the PC1 is disconnected from the B2-channel by this mode switching operation, even if communication data are transmitted from the PC2 to the DIU 1 via the B2-channel, the communication data are blocked in the DIU 1, and only the result code OK is transmitted to the PC1.

When the interrupted data communication is required to be restarted, a restart command is transmitted from the PC1 to the DIU 1. In response to the restart command, the data communication microprocessor 77 in the DIU 1 changes the operation mode from the control mode to the communication mode, so that the PC1 is reconnected to the B2-channel. In this operation, since the communication path is maintained in connection state in the KSU, the data communication can be restarted immediately.

When the data communication is required to be ended, an interrupt command is outputted from the PC1. After having received the result code OK corresponding thereto from the DIU 1, the PC1 transmits an end command. In response to the end command, the DIU 1 transmits this end command to the KSU via the D-channel, and returns a result code OK to the PC1. In response to the end command, the control unit 19 of the KSU controls the time switch 17 so that the communication path between the PC1 and PC2 is disconnected, and outputs disconnection data to the bus 21. This disconnection data is transmitted from the KSU to the DIU 1 and DIU 2 via each D-channel. Under these conditions, although the DIU 1 has already been changed to the control mode, the DIU 2 is still kept in the communication mode. However, in response to the disconnection data, the DIU 2 is switched from the communication mode to the control mode. Thereafter, both the DIU 1 and DIU 2 transmit a result code NO CARRIER indicative of data communication end to the PC1 and PC2, respectively.

An embodiment of the present invention applied to a digital key telephone system has been described. Without being limited thereto, the present invention can be applied to other telephone systems such as home telephone, PBX (public branch-exchange), etc. Further, even when ISDN (integrated service digital network) signals arrive at the office line $7_1$, since the DKT interface unit 11 can process (2B+D) signals, the ISDN signals can be transmitted to the personal computer for signal processing. Further, ISDN signals can be processed in other time division modes, without being limited to only the (2B+D) time division mode.

As described above, in the present invention, since the interface means between the central (key service) unit and the data terminal unit is provided with the communication control function, it si possible to immediately interrupt and restart the data communications between the data terminal units, in response to commands transmitted by each data terminal unit, without depending upon the exchange service executed by the central unit.

What is claimed is:

1. A telephone system, comprising:
   central means having
      exchange means for executing exchange service, and
      exchange control means for controlling said exchange means; and
   interface means
      connected to said exchange means for communication of communication-data therewith,
      connected to said exchange control means for communication of control-data therewith, and
      connected to a data terminal unit for providing an interface for communication of said communication-data between said central means and said data terminal unit;
   said interface means enabling and disabling said communication of said communication-data between said central means and said data terminal unit in response to predetermined control commands included in a data stream received from said data terminal unit, and said interface means enabling and disabling said communication of said communication-data independently of operations of said exchange means in said central means, wherein said interface means transmits first control data to said exchange control means in response to a first control command from said data terminal unit indicative of a data communication start, transmits second control data to said exchange control means in response to a second control command from said data terminal unit indicative of a data communication end, disables said communication of communication-data between said central means and said data terminal unit in response to a third control command from said data terminal unit indicative of a data communication interrupt, and enables said communication of communication-data between said central means and said data terminal unit in response to a fourth control command from said data terminal unit indicative of a data communication restart; and said exchange control means controlling said exchange means so that communication of communication-data between said data terminal unit and another selected data terminal unit is maintained from a time when said first control data is received from said interface means to a time when said second control data is received from said interface means.

2. The telephone system of claim 1, wherein:

said interface means and said central means are connected to each other via a signal line including a first time-division channel through which said communication-data are transmitted and a second time-division channel through which said control-data are transmitted; and said interface means enables and disables said communication of communication-data between said central means and said data terminal unit by connecting and disconnecting said data terminal unit and said first time-division channel.

3. The telephone system of claim 2, further comprising:

an extension telephone set connected to said central means via said signal line;

said signal line further comprising a third time-division channel for said extension telephone set to communicate speech-data with said exchange means;

said extension telephone set communicating control-data for call processing with said exchange control means via said second channel.

4. A telephone system, comprising:

a data terminal unit;

exchange means, in a central unit, for executing exchange service;

exchange control means, in said central unit, for controlling said exchange means; and an interface unit for providing an interface for communication of communication-data between said data terminal unit and said exchange means;

said interface unit enabling and disabling said communication of said communication-data between said exchange means and said data terminal unit in response to predetermined control commands included in a data stream received from said data terminal unit, wherein said interface unit transmits first control data to said exchange control means in response to a first control command from said data terminal unit indicative of a data communication start, transmits second control data to said exchange control means in response to a second control command from said data terminal unit indicative of a data communication end, disables said communication of communication-data between said central unit and said data terminal unit in response to a third control command from said data terminal unit indicative of a data communication interrupt, and enables said communication of communication-data between said central unit and said data terminal unit in response to a fourth control command from said data terminal unit indicative of a data communication restart; and said exchange control means controlling said exchange means so that communication of communication-data between said data terminal unit and another selected data terminal unit is maintained from a time when said first control data is received from said interface unit to a time when said second control data is received from said interface unit.

* * * * *